(12) United States Patent
Little et al.

(10) Patent No.: US 9,389,907 B2
(45) Date of Patent: Jul. 12, 2016

(54) SYSTEM AND METHOD FOR PROVIDING A DISTRIBUTED TRANSACTION LOCK IN A TRANSACTIONAL MIDDLEWARE MACHINE ENVIRONMENT

(71) Applicant: Oracle International Corporation, Redwood Shores, CA (US)

(72) Inventors: Todd J. Little, Palatine, IL (US); Edward A. Heeren, Berkeley Heights, NJ (US); Jimin Cai, Beijing (CN); Xiangdong Li, Beijing (CN); Yunrong Zheng, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 228 days.

(21) Appl. No.: 14/362,096

(22) PCT Filed: Apr. 30, 2014

(86) PCT No.: PCT/CN2014/076602
§ 371 (c)(1),
(2) Date: May 30, 2014

(87) PCT Pub. No.: WO2015/165077
PCT Pub. Date: Nov. 5, 2015

(65) Prior Publication Data
US 2015/0317183 A1     Nov. 5, 2015

(51) Int. Cl.
*G06F 17/30*     (2006.01)
*G06F 9/46*      (2006.01)

(52) U.S. Cl.
CPC ............ *G06F 9/467* (2013.01); *G06F 17/3033* (2013.01); *G06F 17/30362* (2013.01); *G06F 17/30371* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,144,983 | A | * | 11/2000 | Klots .................... G06F 9/52 707/999.008 |
| 7,822,927 | B1 | * | 10/2010 | Scheer ................ G06F 12/0866 707/829 |
| 2007/0005920 | A1 | | 1/2007 | Bacon et al. |
| 2012/0323970 | A1 | | 12/2012 | Larson et al. |
| 2013/0185270 | A1 | | 7/2013 | Brower et al. |
| 2014/0052761 | A1 | | 2/2014 | Teitelbaum |

FOREIGN PATENT DOCUMENTS

EP      0926608     6/1999

OTHER PUBLICATIONS

State Intellectual Property Office of the P.R. China (ISA/CN) International Search Report and Written Opinion dated Jan. 28, 2015 for International Application No. PCT/CN2014/076602, 13 pages.

* cited by examiner

*Primary Examiner* — Etienne Leroux
(74) *Attorney, Agent, or Firm* — Tucker Ellis LLP

(57) ABSTRACT

A system and method can support a distributed transaction lock in a transactional middleware machine environment. The system can use a global transaction identifier to locate a hash bucket in a transaction hash table, wherein the transaction hash table contains a plurality of hash buckets. Then, the system can lock said hash bucket in the transaction hash table, and allow only one process to access one or more global transaction entry structures in the transaction table before said hash bucket is unlocked, wherein said one or more global transaction entry structures are associated with the locked hash bucket in the transaction hash table.

20 Claims, 6 Drawing Sheets

US 9,389,907 B2

SYSTEM AND METHOD FOR PROVIDING A DISTRIBUTED TRANSACTION LOCK IN A TRANSACTIONAL MIDDLEWARE MACHINE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent or records, but otherwise reserves all copyright rights whatsoever.

FIELD OF THE INVENTION

The present invention generally related to computer systems and software such as middleware, and is particularly related to supporting a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein are systems and methods that can support a distributed transaction lock in a transactional middleware machine environment. The system can use a global transaction identifier to locate a hash bucket in a transaction hash table, wherein the transaction hash table contains a plurality of hash buckets. Then, the system can lock said hash bucket in the transaction hash table, and allow only ore process to access one or more global transaction entry structures in the transaction table before said hash bucket is unlocked, wherein said one or more global transaction entry structures are associated with the locked hash bucket in the transaction hash table.

DETAILED DESCRIPTION

Figure 1:
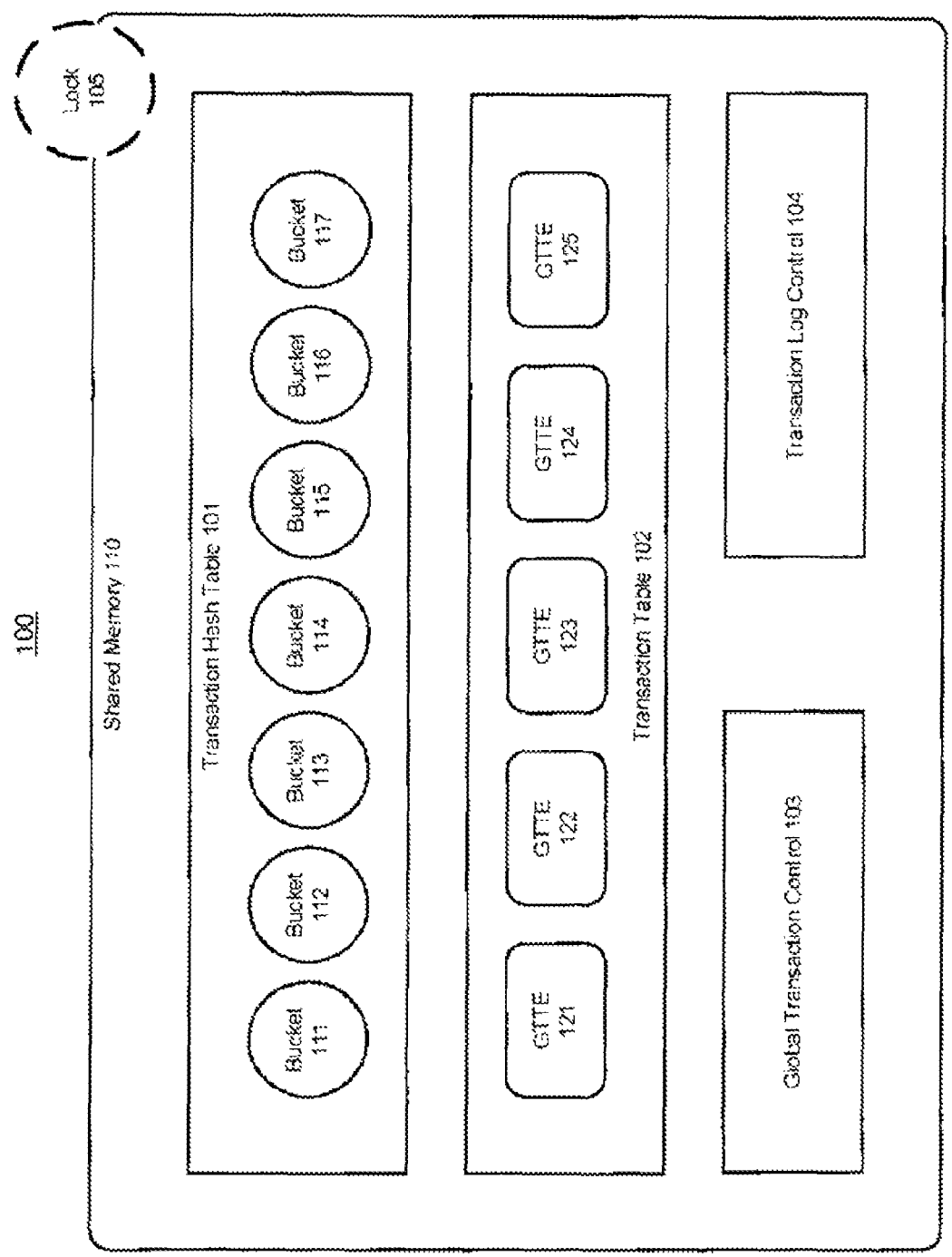
FIG. 1 shows an illustration of a shared memory in a transactional middleware machine environment, in accordance with an embodiment of the invention.

Described herein is a system and method for supporting a distributed transaction lock in a transactional middleware machine environment.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Webioglc. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manacle distributed transaction processing in distributed computing environments. It is a proven platform for unlocking enterprise legacy applications and extending them to a services oriented architecture, while delivering unlimited scalability and standards-based interoperability.

In accordance with an embodiment of the invention, a transactional middleware system, such as a Tuxedo system, can take advantage of fast machines with multiple processors, such as an Exalogic middleware machine, and a high performance network connection, such as an Infiniband (IB) network.

Shared Memory and Lock

FIG. 1 shows an illustration of a shared memory in a transactional middleware machine environment, in accordance with an embodiment of the invention. As shown in FIG.

1, a shared memory data structure 110 can be used to maintain information in a transactional middleware machine environment 100 for various purposes, such as supporting name serving, transaction management, and run-time control.

For example, the Tuxedo system can take advantage of a bulletin board (BB), which is a distributed shared memory that can be at least partially replicated. Furthermore, the Tuxedo system allows an application to be partitioned into a set of cooperating client and server processes, which share the BB.

As shown in FIG. 1, the shared memory 110 can include multiple transaction-related sections, such as a transaction hash table 101, a transaction table 102, a global transaction control structure 103, and a transaction log control structure 104.

The transaction table 102 can contain multiple global transaction entry structures 121-125. For example, the global transaction table (GTT) 102 in Tuxedo can include multiple global transaction table entries (GTTEs) 121-125. Each of the global transaction entry structures can contain shared information about a different global transaction.

The transaction hash table 101, e.g. a global transaction hash table in Tuxedo, can be used to provide fast access to the different entries in the global transaction table 102, where the hashing can be done based on the global transaction identifier (GTRID).

The global transaction control structure 103 contains various control information on different global transactions. For example, the TMGCTL structure in Tuxedo contains the time and counter values (along with the machine ID) that can guarantee the uniqueness of the GTRIDs. Also, the TMGCTL structure can be used when a new GTRID is created.

The transaction log control structure 104 contains various control information on different global transaction log files. For example, the TMTLGCTL structure in Tuxedo contains information pertaining to the state of the transaction log (TLOG) file, and can be used when the TLOG file is updated.

In accordance with an embodiment of the invention, when multi processes or threads read or write data on the shared memory 110, the system can employ a lock 105 to avoid a dirty read and/or a dirty write. The lock 105 can be applied when a process (or a thread) has access to the shared memory 110. Thus, the protected data in the shared memory 110 can only be accessed by only one process or thread at a time.

For example, in Tuxedo, the BB is protected using a user-level semaphore, which is a locking mechanism that is faster than the semaphore provided by the OS kernel. This user semaphore, which is based on a test and set (TAS) assembly component, can ensure a single access to different sections of the BB during critical periods. On the other hand, the user-level semaphore algorithm may not guarantee the lock sequence (i.e., the system may not guarantee that the lock is handed over to the earliest requester).

Additionally, the lock 105 can be recursive, i.e. the system allows the same process to apply the lock 105 repeatedly.

The advantage is that the software developer does not need to worry about whether a particular process holds the lock 105 (or not) at any given time. Also, the software developer can easily retrofit the locks 105 into any existing code.

The trade-off is that the lock 105, which is a giant-lock, may be used to lock large pieces of code for a period of time with arbitrary length. Additionally, the software developer may only have coarse-grained control on the application. For example, when a problem happens in the application program, it can be difficult to find the root cause that involves the lock 105, since the lock 105 may be applied multiple times and the trigger of the problem may locate far away, in the code, from where the hang/deadlock happens.

Furthermore, due to the coarse granularity, the lock 105 may create and/or encounter high contention, e.g. in a transactional scenario. The coarser the granularity of the lock 105 is, the higher the likelihood that the lock 105 may slop/hang. e.g. at an unrelated process, is.

Distribute Transaction Lock

Figure 2:
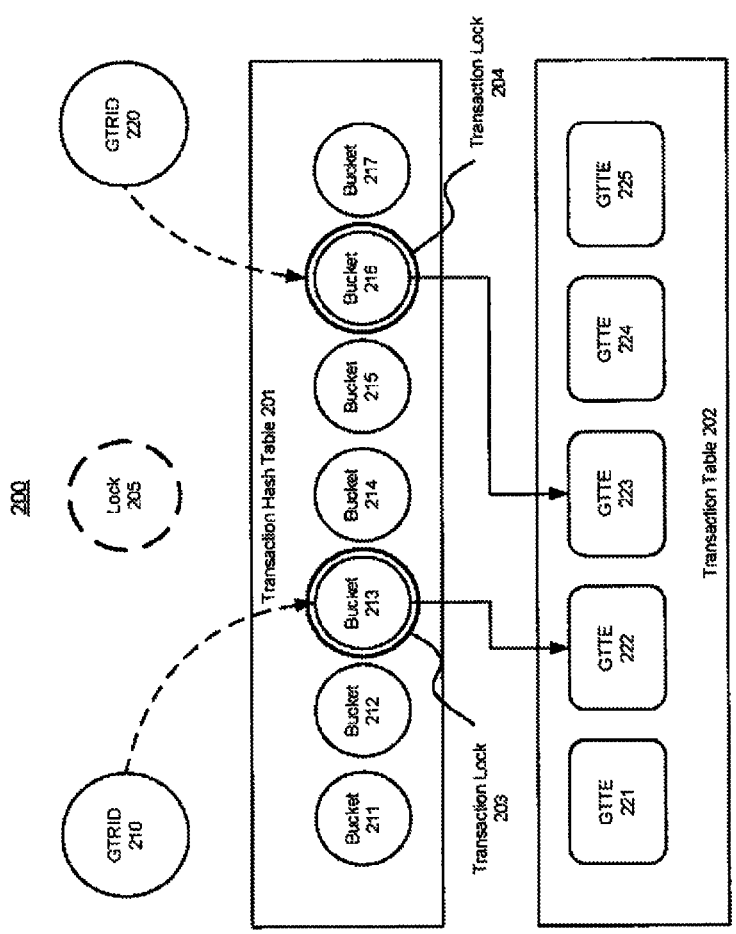
FIG. 2 shows an illustration of a transactional middleware machine environment that supports a transaction lock mechanism, in accordance with an embodiment of the invention.

FIG. 2 shows an illustration of a transactional middleware machine environment that supports a transaction lock mechanism, in accordance with an embodiment of the invention. As shown in FIG. 2, one of more transaction locks 203-204 can be used in a transactional middleware machine environment 200 to improve the transaction performance.

In accordance with an embodiment of the invention, the system can apply separate transaction locks on different hash buckets (e.g. buckets 211-217) in the transaction hash table 201 for accessing the different global transaction entry structures (e.g. GTTEs 221-225) in the global transaction table (GTT) 202. Each transaction hash link can use a dedicated lock (e.g. the transaction lock 203 or 204), which can be based on the user-level semaphore.

For example, the system can locate the hash bucket 213, e.g. by computing a hash function using the GTRID 210. Furthermore, the system can lock the transaction hash table bucket 213, in order to manipulate the GTT entry 213. Then, the system can unlock the hash table bucket 213 and release the lock 203 to another process that may want to access the GTT entry 222.

Additionally, the system can locate the hash bucket 216 using the GTRID 220. The system can lock the transaction hash table bucket 216, in order to manipulate the GTT entry 223. Then, the system can unlock the hash table bucket 223 and release the lock 204 to another process that may want to access the GTT entry 223.

In accordance with an embodiment of the invention, the transaction locks 203-204 can be non-recursive and the system may try to hold the transaction locks 203-204 only when it is necessary, or in a period of time that is as short as practical.

Furthermore, the system can add a transaction lock flag to the control structure (e.g. Tuxedo RTE), in order to quickly know whether a process currently holds a transaction hash lock. For example, in Tuxedo, the transaction lock flag can make it easy for a software developer to know whether unlocking a transaction lock is necessary before calling the bblock( ) function. Also, the software developer is able to know for certain whether an application holds a transaction lock before requesting for another transaction lock.

In accordance with an embodiment of the invention, the number of transaction hash table locks may not be fixed and can be a large number. For example, in Tuxedo, the size of the GTT hash table can be twice the size of the GTT.

Additionally, if two or more GTT entries fall into the same hash bucket, the different GTT entries can use the same transaction lock (i.e. the same transaction hash table lock). For the ease of implementation, the system allows two hash values to share a mutex and the hash mutex can be placed in the GTT to avoid creating an additional BB table.

In accordance with an embodiment of the invention, transactional middleware machine environment 200 can include a lock 205 on the shared memory, in addition to the transactional locks 203-204 on the transaction table hash buckets 213-214.

For example, in Tuxedo, the BB lock 205, which is separated from the transaction locks 203-204, can be held when allocating or deallocating a transaction table entry, when incrementing the GTRID counter, and when incrementing the TLOG current page counter.

Additionally, the BB lock 205 can be used to protect the control structures, such as the TMGCTL and TMTLGCTL data structures, since the operations on these control structures are not frequent. Alternatively, it is also feasible to allow each of the TMGCTL and structure to use a separate lock.

Figure 3:
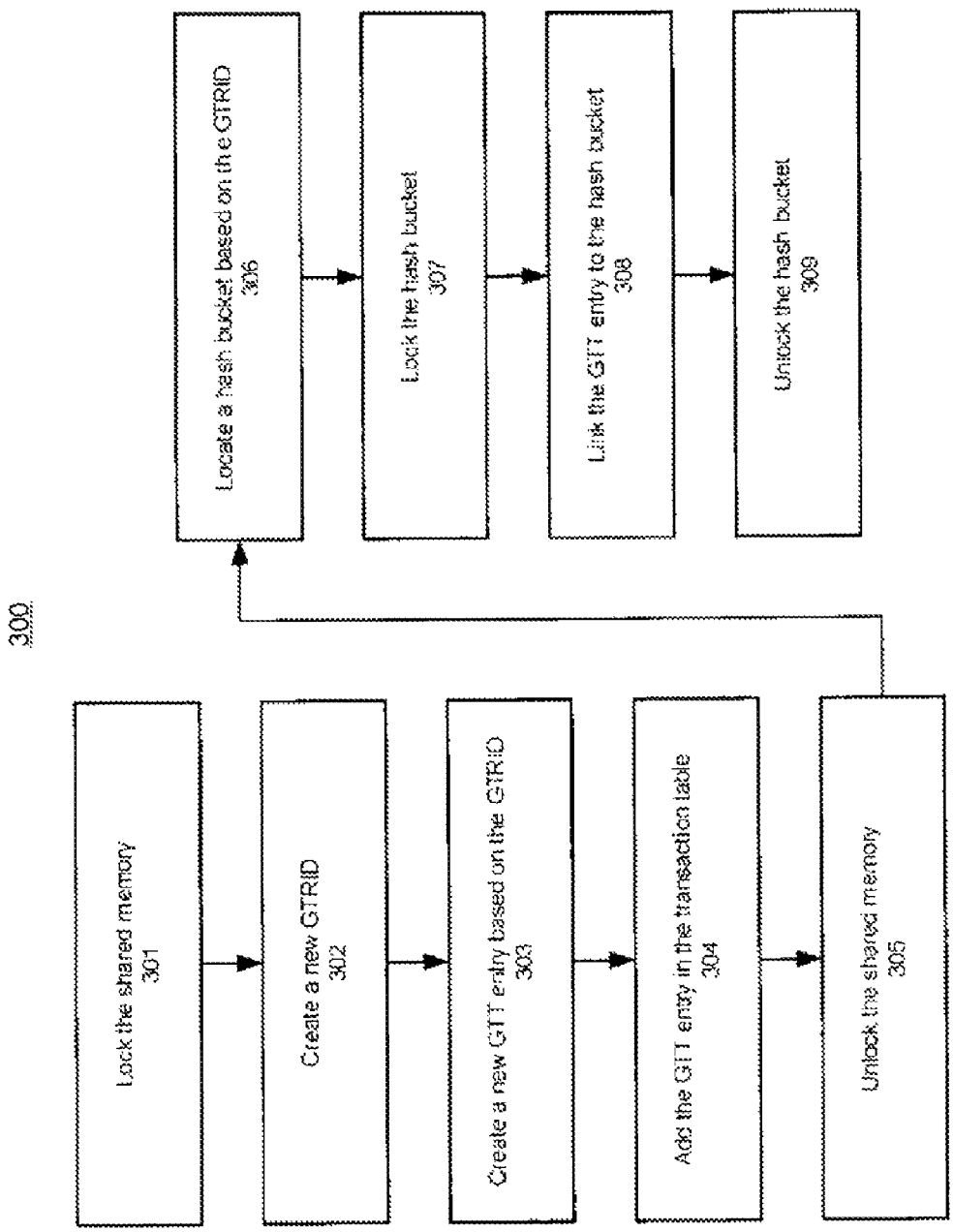
FIG. 3 shows an illustration of adding an entry into the global transaction table (GTT) in a transactional middleware machine environment, in accordance with an embodiment of the invention.

FIG. 3 shows an illustration of adding an entry into the global transaction table (GTT) in a transactional middleware machine environment, in accordance with an embodiment of the invention.

At step 301, the system can lock the shared memory, e.g. the Tuxedo BB, in a transactional middleware machine environment 300. Furthermore, at step 302, the system can create a new GTRID. Also, at step 303, the system can create a new GTT entry based on the GTRID. Furthermore, at step 304, the system can add the GTT entry into the transaction table, e.g. the Tuxedo TMGTTE table, and at step 305, the system can unlock the shared memory so that other processes can have access to the shared memory.

Then, at step 306, the system can locate a hash bucket in the transaction hash table (e.g. using hashing based on the GTRID), and at step 307, the system can lock the hash bucket in the transaction hash table. Furthermore, at step 308, the system can link the GTT entry to the hash bucket in the transaction hash table, and at step 309, the system can unlock the hash table bucket.

Figure 4:
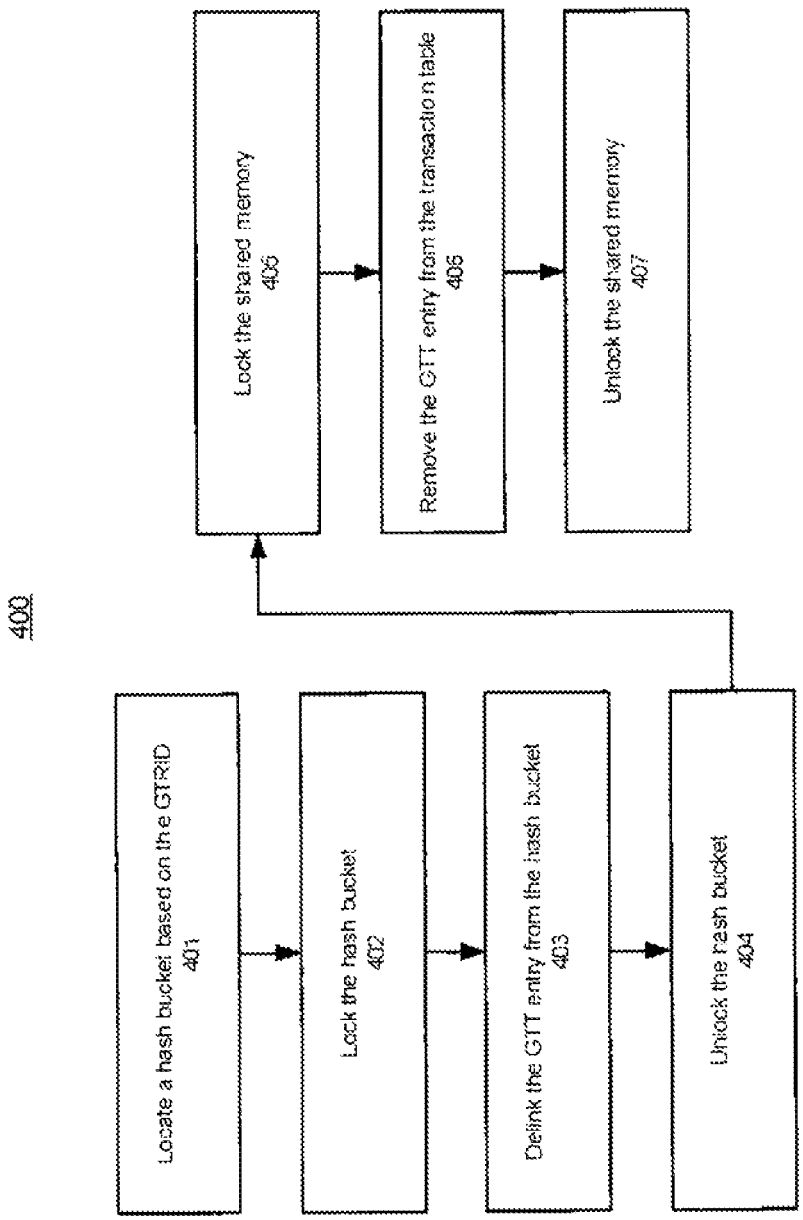
FIG. 4 shows an illustration of deleting an entry from the global transaction table (GTT) in a transactional middleware machine environment, in accordance with an embodiment of the invention.

FIG. 4 shows an illustration of deleting an entry from the global transaction table (GTT) in a transactional middleware machine environment, in accordance with an embodiment of the invention.

At step 401, the system can locate a hash bucket in the transaction hash table using the GTRID in a transactional middleware machine environment 400, and at step 402, the system can lock the hash bucket in the transaction hash table. Furthermore, at step 403, the system can delink the GTT entry from the hash bucket in the transaction hash table, and at step 404, the system can unlock the hash bucket in the transaction hash table so that other processes can reuse the hash bucket in the transaction hash table.

Then, at step 405, the system can lock the shared memory. At step 406, the system can remove the GTT entry in the TMGTTE table, and at step 407, the system can unlock the shared memory so that other processes can have access to the shared memory.

Figure 5:
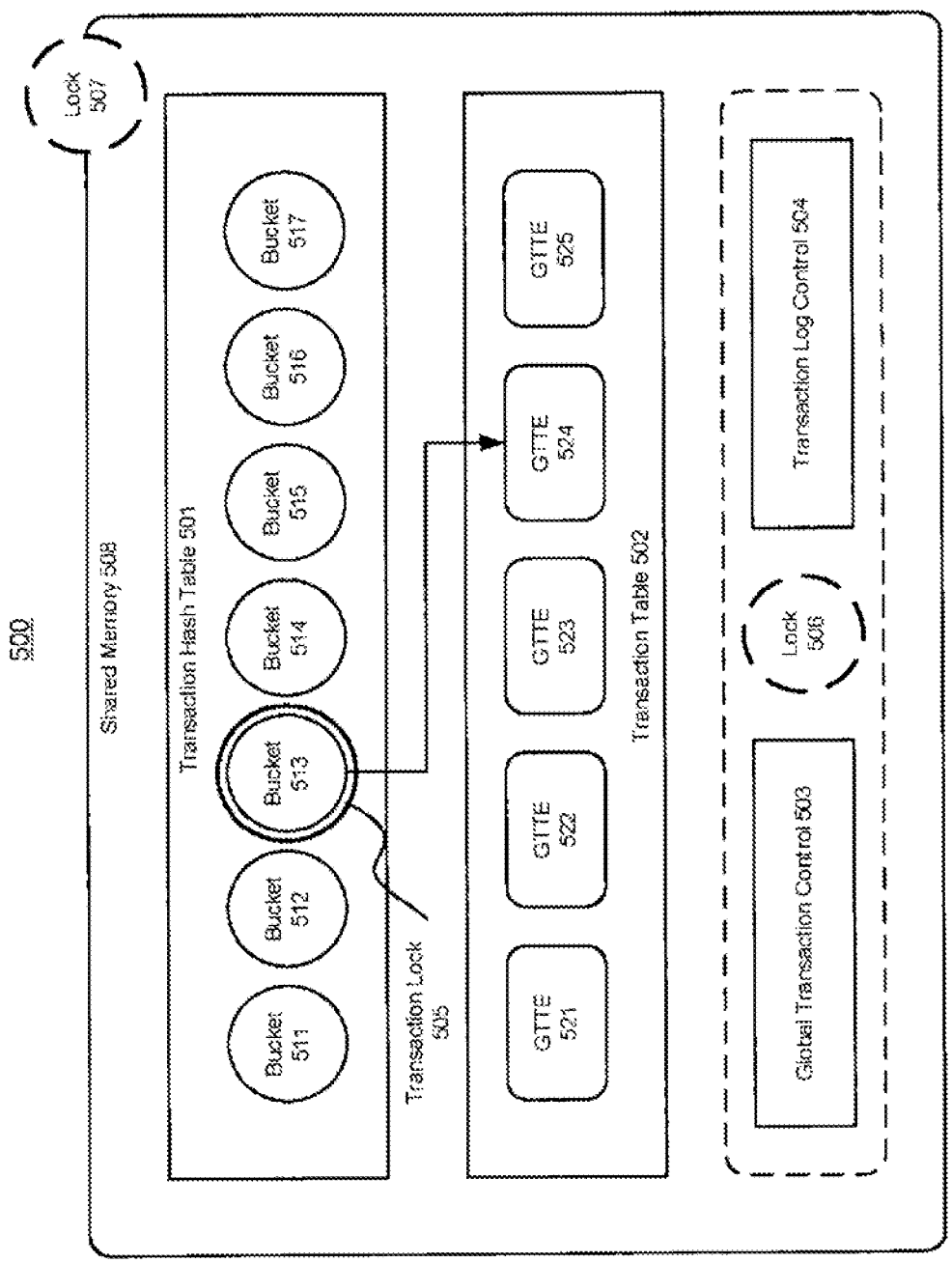
FIG. 5 shows an illustration of supporting a granular lock mechanism in a transactional middleware machine environment, in accordance with an embodiment of the invention.

FIG. 5 shows an illustration of supporting a granular lock mechanism in a transactional middleware machine environment, in accordance with an embodiment of the invention. As shown in FIG. 5, the shared memory 508 in a transactional middleware machine environment 500 can include multiple transaction-related sections, such as a transaction hash table 501 (containing a plurality of has buckets, e.g. buckets 511-517), a transaction table 502 (containing a plurality of entries, e.g. GTTEs 521-525), a global transaction control 503, and a transaction log control 504.

Furthermore, the transactional middleware machine environment 500 allows a process (or a thread) to hold multiple locks, which includes a lock 507 on the shared memory 508, and a lock 506 on the control structures (such as the global transaction control 503, and a transaction log control 504). Additionally, there can be one or more transaction locks, e.g. a transaction lock 505 on the hash bucket 513.

In accordance with an embodiment of the invention, the system can employ a granular lock mechanism for handling lock dependencies, which may occur when multiple locks are used by different processes.

In Tuxedo, the BB lock 507 can be used in different places in an interleaved fashion. For Example, lock dependency can be a concern in the following scenario.

A function A can call a function B while the function A holds the BB lock. Then, The function B may lock the BB again. Furthermore, the function B can access a GTTE (using a transaction lock) and call a function C, which may lock the BB for the third time.

In order to avoid deadlock among the various locks held by a single process (or thread), the system can apply a partial ordering scheme on the locks. For example, the system can order the different locks based on the scope or the granularity.

As shown in FIG. 5, the lock 507 on the shared memory 508, which has the coarsest granularity, can be assigned with the lowest number. On the other hand, and the transaction lock 505, which has the finest granularity, can be assigned with the highest number. Additionally, the system can order the lock 506 on the control structures in between.

The system can ensure that a process can only lock one hash bucket in the transaction hash table 501 at any given time, i.e. a process may not lock another hash bucket when it has already held one transaction lock on a hash bucket. Thus, the system can avoid the deadlock among the transaction locks (or the locks assigned with the same number).

Additionally, a process may only be allowed to acquire a lock with a number higher than the highest-number among all the numbers, which are assigned to the locks that the process already holds.

For example, in Tuxedo, a thread A, which holds a BB lock, can hold a transaction lock, since the transaction lock is assigned with a number, which is higher than the number that is assigned to the BB lock. On the other hand, a thread B, which holds a transaction lock, may not hold the BB lock. The thread B must first release the transaction lock before holding the BB lock, since the transaction lock is assigned with a number, which is higher than the number assigned to the BB lock.

Furthermore, the thread A may be able to acquire the transaction lock when the transaction lock is released by the thread B. After the thread A completes and releases the transaction lock and the BB lock, the thread B may be able to acquire both locks and run to completion without deadlock.

Thus, the system can improve the transaction performance by reducing the chance that a programmer may unintentionally introduce a deadlock among the different locks in the system.

Figure 6:
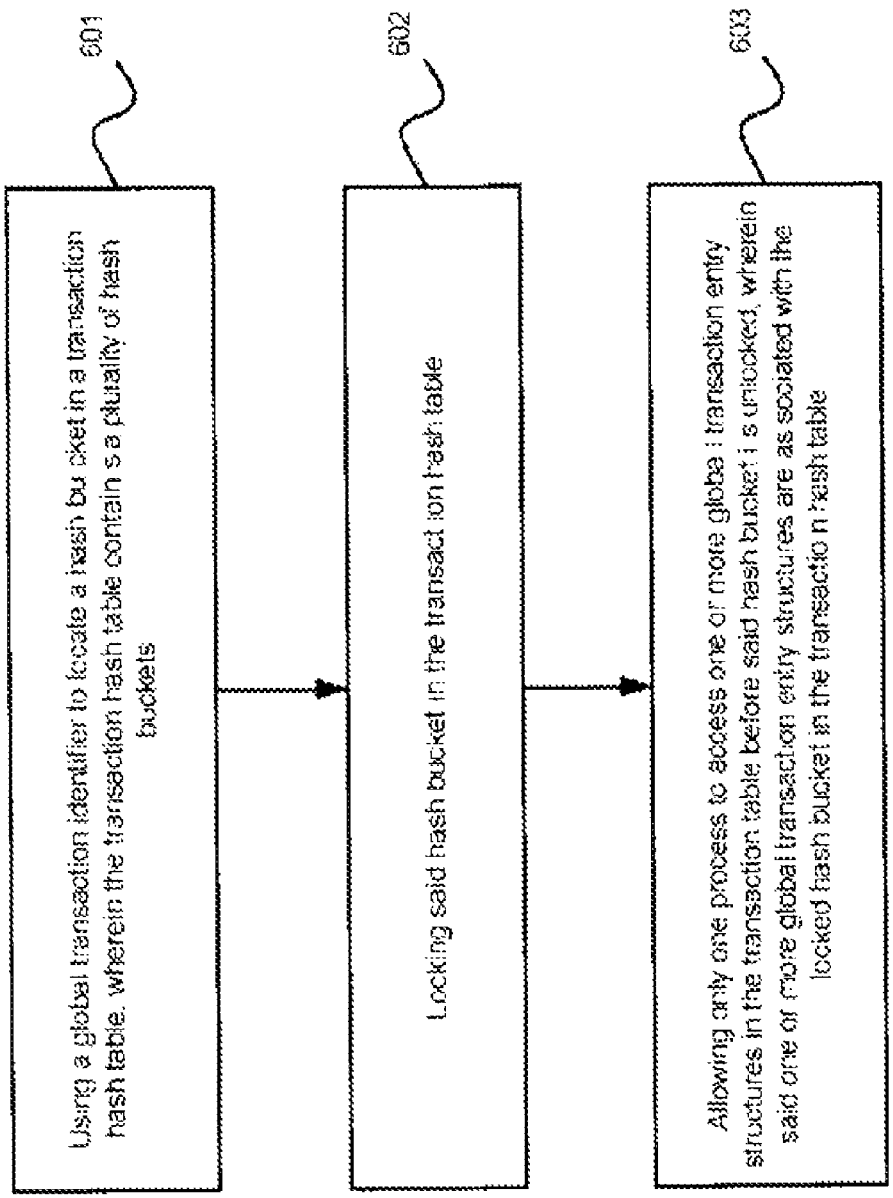
FIG. 6 illustrates an exemplary flow chart for supporting a transaction lock mechanism in a transactional middleware machine environment, in accordance with an embodiment of the invention.

FIG. 6 illustrates an exemplary flow chart for supporting a transaction lock mechanism in a transactional middleware machine environment, in accordance with an embodiment of the invention. As shown in FIG. 6, at step 601, the system can use a global transaction identifier to locate a hash bucket in a transaction hash table, wherein the transaction hash table contains a plurality of hash buckets. Then, at step 602, the system can lock said hash bucket in the transaction hash table, and at step 603, the system allows only one process to access one or more global transaction entry structures in the transaction table before said hash bucket is unlocked, wherein said one or more global transaction entry structures are associated with the locked hash bucket in the transaction hash table.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a distributed transaction lock in a transactional middleware machine environment, comprising:
   using a global transaction identifier to locate a hash bucket in a transaction hash table, wherein the transaction hash table contains a plurality of hash buckets;
   locking said hash bucket in the transaction hash table; and
   allowing only one process to access one or more global transaction entry structures in the transaction table before said hash bucket is unlocked, wherein said one or more global transaction entry structures are associated with the locked hash bucket in the transaction hash table.

2. The method of claim 1, further comprising:
   using another global transaction identifier to locate another hash bucket in the transaction hash table.

3. The method of claim 2, further comprising:
   allowing another process to access another one or more global transaction entry structures in the transaction table, wherein said another one or more global transaction entry structures are associated with said another hash bucket in the transaction hash table.

4. The method of claim 1, further comprising:
   containing said transaction hash table and said transaction hash table in a shared memory.

5. The method of claim 4, further comprising:
   locking the shared memory,
   creating a new global transaction identifier and one or more new global transaction entry structures,
   adding said one or more new global transaction entry structures into the in the transaction table, and
   unlocking the shared memory.

6. The method of claim 5, further comprising:
   locking another hash bucket in the transaction hash table that is associated with the new global transaction identifier,
   linking said one or more new global transaction entry structures with said another hash bucket in the transaction hash table, and
   unlocking said another hash bucket in the transaction hash table.

7. The method of claim 4, further comprising:
   delinking said one or more global transaction entry structures with said hash bucket in the transaction hash table,
   unlocking said hash bucket in the transaction hash table,
   locking the shared memory,
   removing said one or more global transaction entry structures in the transaction table, and
   unlocking the shared memory.

8. The method of claim 4, further comprising:
   containing a global transaction control structure and a transaction log control structure in the shared memory.

9. The method of claim 8, further comprising:
   providing a set of locks for a global transaction with a global transaction identifier, wherein the set of locks include a lock on the shared memory, a lock on the global transaction control structure and the transaction log control structure, and a lock on a hash bucket in the transaction hash table.

10. The method of claim 1, further comprising:
    applying a partial ordering scheme on the set of locks for the global transaction to avoid deadlock.

11. A system for providing a distributed transaction locking mechanism in a transactional middleware machine environment, comprising:
    one or more processors;
    a transactional server, running on the one or more processors, operate to
      use a global transaction identifier to locate a hash bucket in a transaction hash table, wherein the transaction hash table contains a plurality of hash buckets;
      lock said hash bucket in the transaction hash table; and
      allowing only one process to access one or more global transaction entry structures in the transaction table before said hash bucket is unlocked, wherein said one or more global transaction entry structures are associated with the locked hash bucket in the transaction hash table.

12. The system of claim 11, wherein:
    the transactional server operates to use another global transaction identifier to locate another hash bucket in the transaction hash table.

13. The system of claim 12, wherein:
    the transactional server allows another process to access another one or more global transaction entry structures in the transaction table, wherein said another one or more global transaction entry structures are associated with said another hash bucket in the transaction hash table.

14. The system of claim 11, wherein:
    a shared memory contains said transaction hash table and said transaction hash table.

15. The system of claim 14, wherein:
    the transactional server operate to
      lock the shared memory,
      create a new global transaction identifier and one or more new global transaction entry structures,
      add said one or more new global transaction entry structures into the in the transaction table, and
      unlock the shared memory.

16. The system of claim 15, wherein:
    the transactional server operate to
      lock another hash bucket in the transaction hash table that is associated with the new global transaction identifier,
      link said one or more new global transaction entry structures with said another hash bucket in the transaction hash table, and unlock said another hash bucket in the transaction hash table.

17. The system of claim 14, wherein:
the transactional server operate to
delink said one or more global transaction entry structures with said hash bucket in the transaction hash table,
unlock said hash bucket in the transaction hash table,
lock the shared memory,
remove said one or more global transaction entry structures in the transaction table, and
unlock the shared memory.

18. The system of claim 14, wherein:
the shared memory contains a global transaction control structure and a transaction log control structure.

19. The system of claim 18, wherein:
the transactional server operate to
provide a set of locks for a global transaction with a global transaction identifier, wherein the set of locks include a lock on the shared memory, a lock on the global transaction control structure and the transaction log control structure, and a lock on a hash bucket in the transaction hash table, and
apply a partial ordering scheme on the set of locks for the global transaction to avoid deadlock.

20. A non-transitory machine readable storage medium having instructions stored thereon that when executed cause a system to perform the steps comprising:
using a global transaction identifier to locate a hash bucket in a transaction hash table, wherein the transaction hash table contains a plurality of hash buckets;
locking said hash bucket in the transaction hash table; and
allowing only one process to access one or more global transaction entry structures in the transaction table before said hash bucket is unlocked, wherein said one or more global transaction entry structures are associated with the locked hash bucket in the transaction hash table.

* * * * *